(12) United States Patent
Zhong (10) Patent No.: US 12,373,371 B2
(45) Date of Patent: Jul. 29, 2025

(54) SELF-RELIANT SmartNICs

(71) Applicant: XILINX, INC., San Jose, CA (US)

(72) Inventor: Guanwen Zhong, Singapore (SG)

(73) Assignee: XILINX, INC., San Jose, CA (US)

( * ) Notice: Subject to any disclaimer, the term of this patent is extended or adjusted under 35 U.S.C. 154(b) by 25 days.

(21) Appl. No.: 18/199,335

(22) Filed: May 18, 2023

(65) Prior Publication Data
US 2024/0385983 A1 Nov. 21, 2024

(51) Int. Cl.
*G06F 13/38* (2006.01)
*G06F 13/366* (2006.01)

(52) U.S. Cl.
CPC .......... *G06F 13/385* (2013.01); *G06F 13/366* (2013.01); *G06F 2213/3808* (2013.01)

(58) Field of Classification Search
None
See application file for complete search history.

(56) References Cited

U.S. PATENT DOCUMENTS

| | | | | |
|---|---|---|---|---|
| 9,459,957 | B2* | 10/2016 | Sella | G06F 11/1076 |
| 10,776,164 | B2* | 9/2020 | Zhao | G06N 3/084 |
| 11,275,622 | B2* | 3/2022 | Li | G06F 9/505 |
| 11,444,890 | B2* | 9/2022 | Zakin | H04L 69/321 |
| 12,026,116 | B2* | 7/2024 | Kutch | G06F 12/0802 |
| 2018/0288137 | A1* | 10/2018 | Veeramani | H04L 67/34 |
| 2020/0344299 | A1* | 10/2020 | Sohail | H04L 67/12 |
| 2023/0342037 | A1* | 10/2023 | Sahin | G06F 3/0659 |
| 2024/0095062 | A1* | 3/2024 | Chakraborty | G06F 9/44594 |

OTHER PUBLICATIONS

AMD-Xilinx, Alveo SN1000 SmartNIC Accelerator Card, 9 pgs, https://www.xilinx.com/applications/data-center/network-acceleration.html.
AMD-Xilinx, QDMA Ethernet Platform, 2 pgs, https://xilinx.github.io/qep-drivers/1.2.0/linux-kernel/html/system-overview.html.
V. Krishnan, et al., "COnfigurable Network Protocol Accelerator (COPA): An Integrated Networking/Accelerator Hardware/Software Framework," 2020 IEEE Symposium on High-Performance Interconnects (HOTI), Piscataway, NJ, USA, 2020, pp. 17-24.
D. Rossetti, "GPUDirect: Integrating the GPU with a Network Interface", 2015 GPU Technology Conference, 18 pgs.
K. Hamidouche, et al., "GPU initiated OpenSHMEM: correct and efficient intra-kernel networking for dGPUs", PPoPP 2020, 12 pgs.

\* cited by examiner

*Primary Examiner* — Elias Mamo
(74) *Attorney, Agent, or Firm* — Patterson + Sheridan, LLP (57) ABSTRACT

Embodiments herein describe a self-reliant Network Interface Controller (NIC) that can perform the maintenance and control operations part of performing a distributed computation which relies on data received from multiple peers (or nodes) that are connected by a network. Rather than a CPU-driven adaptive compute where the CPU(s) in a host perform maintenance and control operations, the embodiments herein shift these operations to the NIC. The NIC can perform control operations such as determining when data has been received from remote peers, or a compute task has been completed and then inform the host CPU when the operation is complete.

20 Claims, 8 Drawing Sheets

SELF-RELIANT SmartNICs

TECHNICAL FIELD

Examples of the present disclosure generally relate to offloading application-specific control operations on adaptive network interface controllers (NICs) such as Smart-NICs.

BACKGROUND

SmartNICs (referred to as Smart Network Interface Controllers or Smart Network Interface Cards) contain not only NIC functionalities such as transport-layer offloading, packet processing, network function virtualization, quality of service, monitoring/analytics, and security, but also adaptive computing features in the form of hardware accelerators. These accelerators may be Application Specific Integrated Circuits (ASICs), Field Programmable Gate Arrays (FPGAs), Graphics Processing Units (GPUs), Digital Signal Processors (DSPs), or others.

In traditional adaptive SmartNICs, Central Processing Units (CPUs) in the host control the NIC functionalities and the hardware accelerators in the SmartNIC. There is no interaction between the NIC functionalities and the hardware accelerators. When running a distributed application on this architecture, the host CPUs need to issue read/receive operations to the NIC for receiving messages from remote peers, trigger the accelerators for computation when all messages are received and send/write to remote peers as required when computation is finished. This traditional adaptive SmartNIC setup often leads to high CPU utilization (due to control tasks execution), and thus incurs long latency, especially for scale-out applications, such as machine learning training for massive-scale models.

SUMMARY

One embodiment described herein is a NIC that includes an accelerator including one or more integrated circuits. The NIC also includes circuitry configured to receive an instruction from a host central processing unit (CPU) coupled to the NIC to perform an operation that is part of a distributed application, transmit, via a network, a request to a peer to provide data to perform the operation, receive the data from the peer via the network, in response to the NIC having all data required to perform the operation, instruct the accelerator to perform the operation, and inform the host CPU after the operation is complete.

One embodiment described herein is a method that includes receiving, at a NIC, an instruction from a host CPU to perform an operation that is part of a distributed application; transmitting, by the NIC via a network, a request to a peer to provide data to perform the operation; receiving the data at the NIC; in response to the NIC having all data required to perform the operation, performing the operation using an accelerator on the NIC; and informing the host CPU once the operation is complete.

One embodiment described herein is a SmartNIC that includes an accelerator, a first controller, and a second controller. The first controller including circuitry configured to receive an instruction from a host CPU coupled to the SmartNIC to perform an operation that is part of a distributed application, transmit, via a network, a request to a peer to provide data to perform the operation, receive the data from the peer via the network, and in response to the SmartNIC having all data required to perform the operation, instruct the accelerator to perform the operation. The second controller comprising circuitry configured to inform the host CPU after the operation is complete and trigger the Smart-NIC to transmit results of performing the operation to destination peers.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the embodiments herein or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe a self-reliant SmartNIC that can perform the maintenance and control operations that are part of performing a distributed application which relies on data received from multiple peers (or nodes) that are connected by a network. Rather than a CPU-driven adaptive compute where the CPU(s) in a host perform maintenance and control operations, the embodiments herein shift these operations to the SmartNIC. As a result, the CPU is removed from the critical path. Thus, the time the CPU would normally spend polling the SmartNIC to determine when operations have been completed (e.g., when a group of messages has been all received from remote peers, or when a compute task has been completed) and issuing communication requests after computation (e.g., constructing write control operations) is offloaded to the SmartNIC which frees the CPU to perform other operations or to switch to a low power state.

In one embodiment, the SmartNIC can include hardware logic (e.g., circuitry implemented in an integrated circuit) which performs the maintenance and control operations that are part of performing a distributed application. For example, a first controller can detect readiness of incoming messages required by a kernel accelerator. The first controller can then instruct the accelerator in the SmartNIC to perform the compute operation using the received peer data. The second controller can monitor completion status of a kernel accelerator and issue requests to the transport-layer offloading engine for data transmission without the CPU's involvement. Thus, the CPU is free to perform other tasks. In this manner, the CPU is removed from the critical path.

Figure 1:
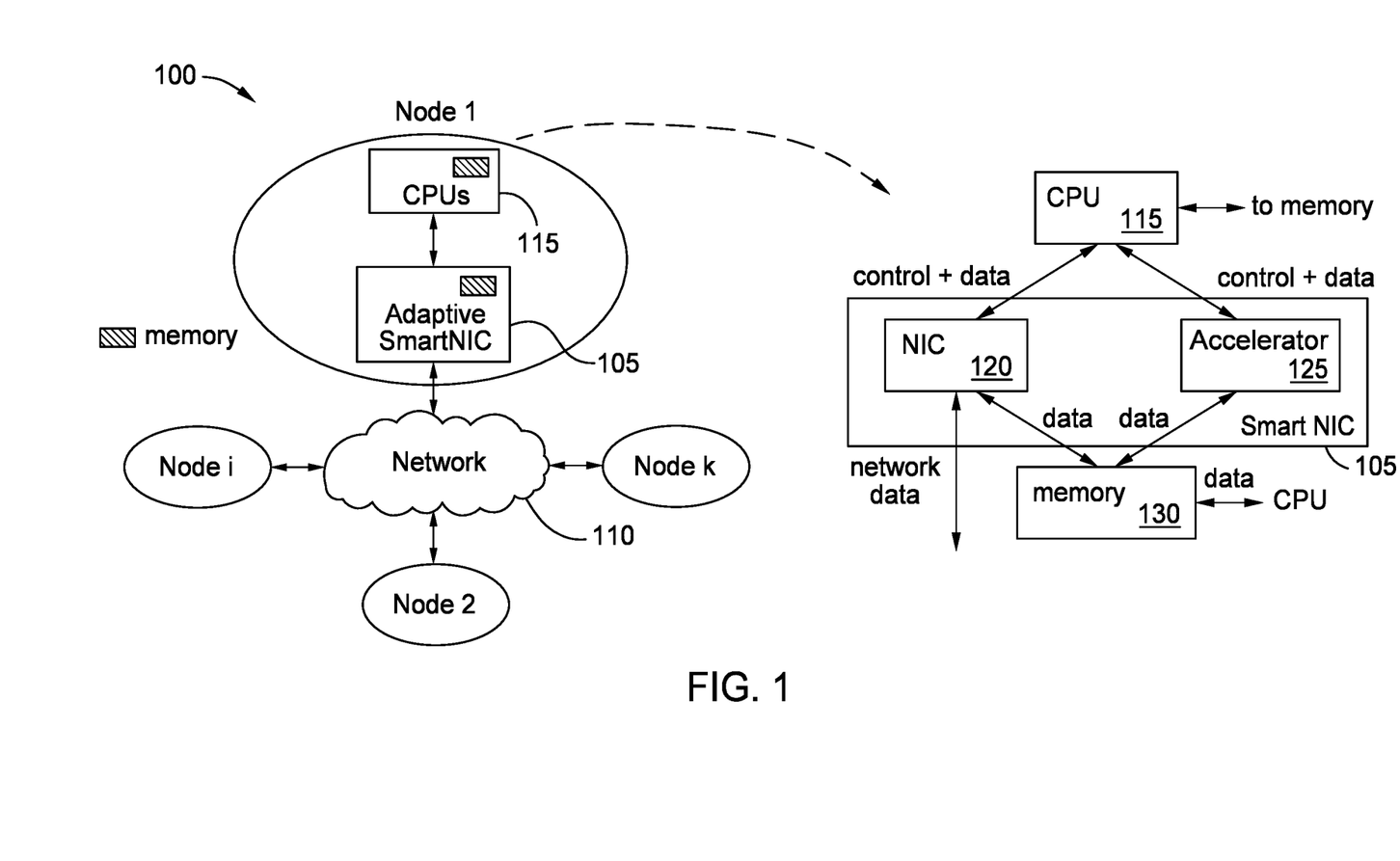
FIG. 1 illustrates CPU-driven adaptive compute in a SmartNIC, according to an example.

FIG. 1 illustrates CPU-driven adaptive compute in a SmartNIC 105, according to an example. FIG. 1 depicts one type of data center architecture 100 with multiple peers (or nodes) connected via a network 110. Each peer is equipped with multi-core CPUs 115 and an adaptive SmartNIC 105. The SmartNIC 105 contains NIC functionalities performed by NIC circuitry 120, which can include transport-layer offloading, packet processing, network function virtualization, quality of service, monitoring/analytics, and security. The SmartNIC 105 also contains an accelerator 125 that performs adaptive computing features. The accelerator 125 can be implemented using an ASIC, FPGA, GPU, DSP, and the like.

In FIG. 1, the CPUs 115 (which are disposed in the host) control the NIC circuitry 120 and the accelerator 125 in the SmartNIC 105. In this embodiment, there is no interaction between the NIC circuitry 120 and the accelerator 125. Instead, these hardware components rely on the host CPU 115 to provide instructions.

When running a distributed application on the architecture 100, the host CPUs 115 issue read/receive operations to the NIC circuitry 120 for receiving messages from remote peers, detect readiness of the requested messages, trigger the accelerator 125 for computation when the messages are all received, wait for the computation to be completed, and write results to destinations (If required) when computation is finished. For example, some SmartNICs 105 may perform basic Remote Direct Memory Access (RDMA) read/write control (including work-queue-element construction and send/completion queue doorbell ringing) to the NIC circuitry 120 in the accelerator 125, which is a lookaside accelerator. Other SmartNICs 105 may have similar control offload by offloading RDMA read/write control from the host CPUs 115 onto the accelerator 125 (e.g., a discrete GPU). These architectures 100, however, do not consider application-specific control operations, and still rely on the host CPUs 115 to detect readiness of messages required and trigger its compute elements for computation, especially considering that messages from peers over the network might arrive out of order.

Regarding high-speed (40 Gbps-400 Gbps) network setups in current data center infrastructures, the adaptive SmartNIC setup in the architecture 100 can result in high CPU utilization (due to control tasks execution), and thus incur long latency, especially for scale-out distributed applications, such as machine learning training for massive-scale models.

Figure 2:
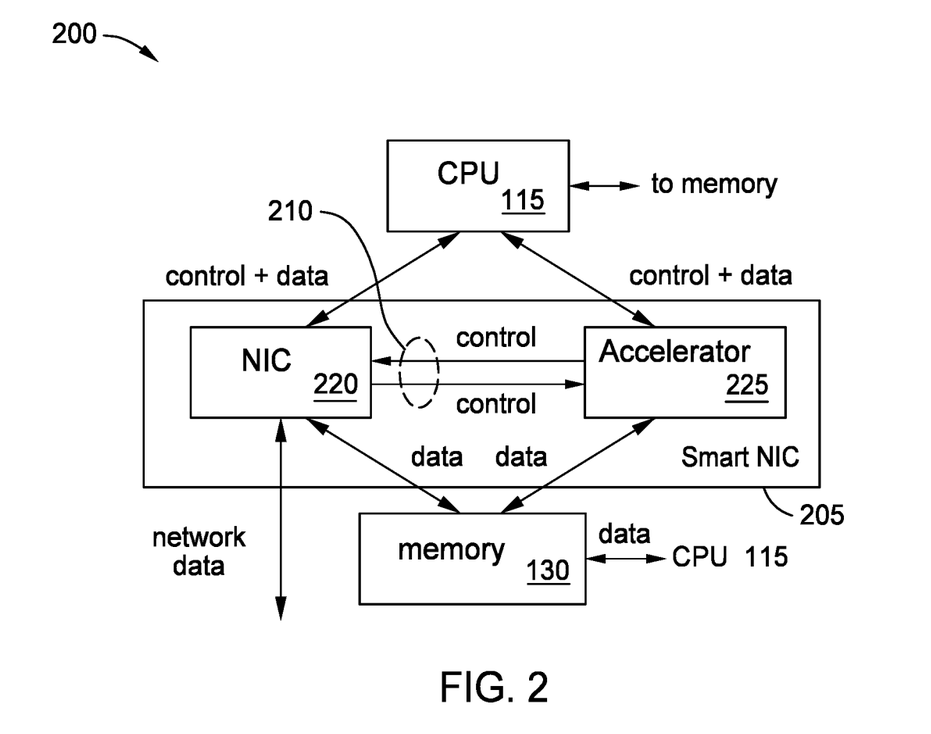
FIG. 2 illustrates a self-reliant adaptive SmartNIC, according to an example.

FIG. 2 illustrates a self-reliant adaptive SmartNIC 205, according to an example. To avoid the high host CPU utilization and long latency of the architecture 100 in FIG. 1, the architecture 200 in FIG. 2 illustrates offloading application-specific control operations from the host CPU 115 to the SmartNIC 205, thus mitigating the workload on the CPU 115. In a context in which an accelerator 225 is integrated within the SmartNIC 205, this implies introducing interactions between the NIC circuitry 220 and the accelerator 225 within the SmartNIC 205 as shown by the arrows 210.

The architecture 200 offloads application-specific control operations (represented by the arrows 210) previously performed by the host CPUs 115 onto a SmartNIC 205. It enables the NIC circuitry 220 (or a communication component in the SmartNIC 205) to directly trigger computation in the accelerator 225 when the necessary messages are received, without the host CPU's involvement. Moreover, the accelerator 225 can issue send/write requests as needed to the NIC circuitry 220 after computation is finished again without the host CPU's involvement. The self-reliant adaptive SmartNIC 205 can significantly reduce CPU utilization and achieve low latency.

Figure 3:
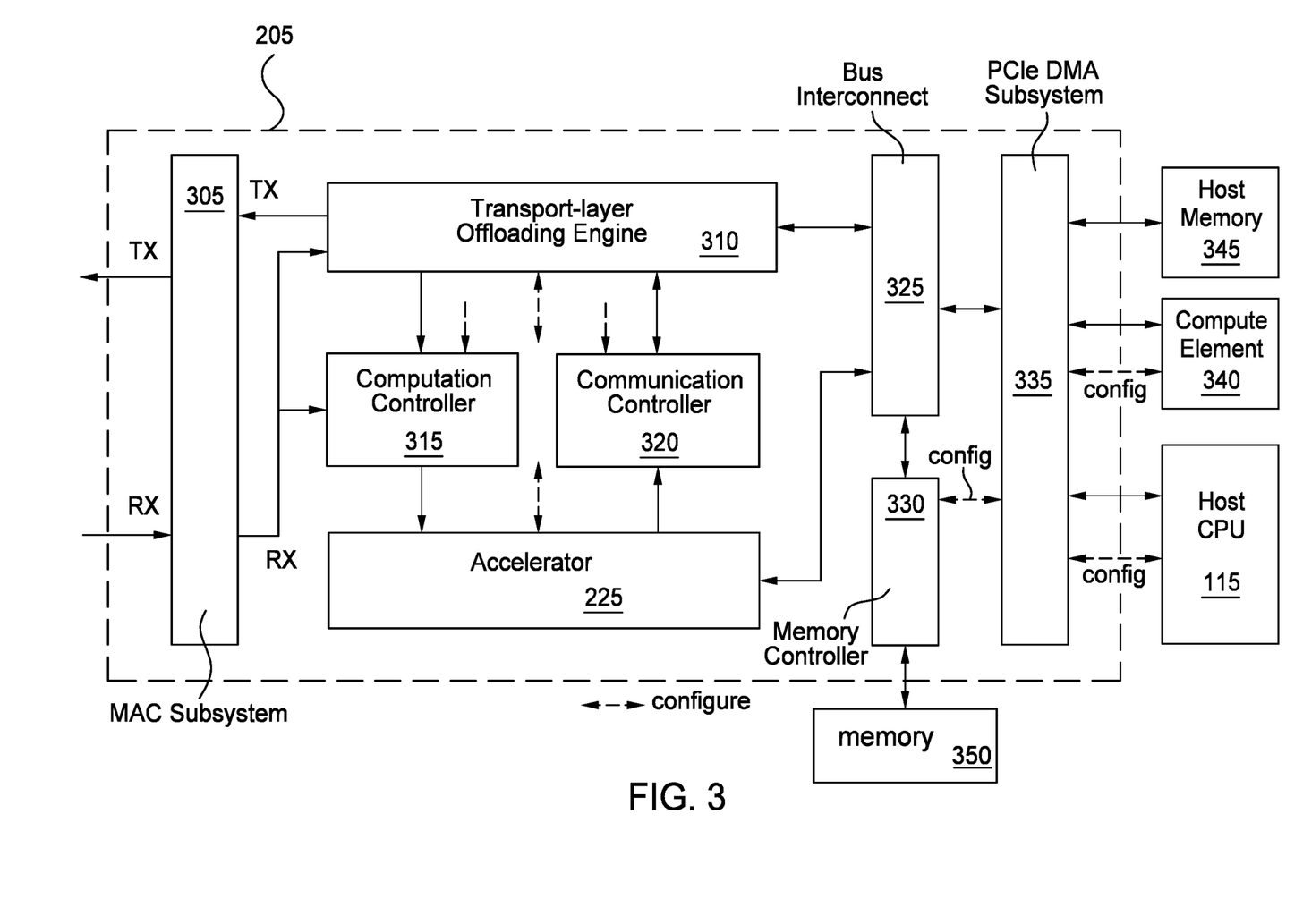
FIG. 3 shows an example architecture of the self-reliant adaptive SmartNIC in FIG. 2, according to an example.

FIG. 3 shows an example architecture of the self-reliant adaptive SmartNIC 205 in FIG. 2. The SmartNIC 205 includes a MAC subsystem 305, a transport-layer offloading engine 310, the accelerator 225, a computation controller 315, a communication controller 320, a bus interconnect 325, a memory controller 330, and a Peripheral Component Interconnect Express Direct Memory Access (PCIe DMA) subsystem 335. In one embodiment, all of the components may be implemented using hardware (e.g., circuitry which can be in one or more integrated circuits).

As shown, the SmartNIC 205 is coupled to the host CPU 115, a compute element 340, and host memory 345. The SmartNIC 205 can also be coupled to local memory 350 which may be disposed within the SmartNIC 205 or may be memory in the host that is accessible by the SmartNIC 205.

In one embodiment, the transport-layer offloading engine 310 supports RDMA engines, Transmission Control Protocol (TCP) offloading engines, and the like. The discussion below assumes an RDMA implementation of the transport-layer offloading engine 310 when describing the operations performed by the various other components, but similar workflows can be envisioned with other transport protocols, such as TCP.

The communication components in the SmartNIC 205, including MAC subsystem 305, the transport-layer offloading engine 310 and the PCIe DMA subsystem 335 in FIG. 3, can be part of the NIC circuitry 220 in FIG. 2. On the other hand, the self-reliant features of the SmartNIC 205 are composed of two components: the computation controller 315 and the communication controller 320. In one embodiment, the computation controller 315 detects readiness of incoming messages from the network (e.g., the network 110 in FIG. 1) and triggers execution of kernels in the accelerator 225 after the necessary messages are received at the SmartNIC 205. Put differently, the computation controller 315 can kick-off or start the accelerator 225 after the data required to perform a task has been gathered from the remote peers or nodes.

In one embodiment, the communication controller 320 issues communication requests to the transport-layer offloading engine 310 when computation (e.g., a particular task) in the accelerator 225 is done. The computation controller 315 and communication controller 320 can be implemented with any kind of circuitry in an integrated circuit including an ASIC, FPGA, GPU, and the like.

The configuration signals (illustrated by dashed arrows in FIG. 3) from the host CPU 115 or the compute element 340 (e.g., a discrete GPU, FPGA, ASIC, etc.) are used to configure some of the components in the SmartNIC 205 (e.g., the transport-layer offloading engine 310 and the accelerator 225), and to populate tables in the computation controller 315 and the communication controller 320. The tables in the controllers 315 and 320 are discussed in more detail in FIGS. 7 and 8.

Figure 4:
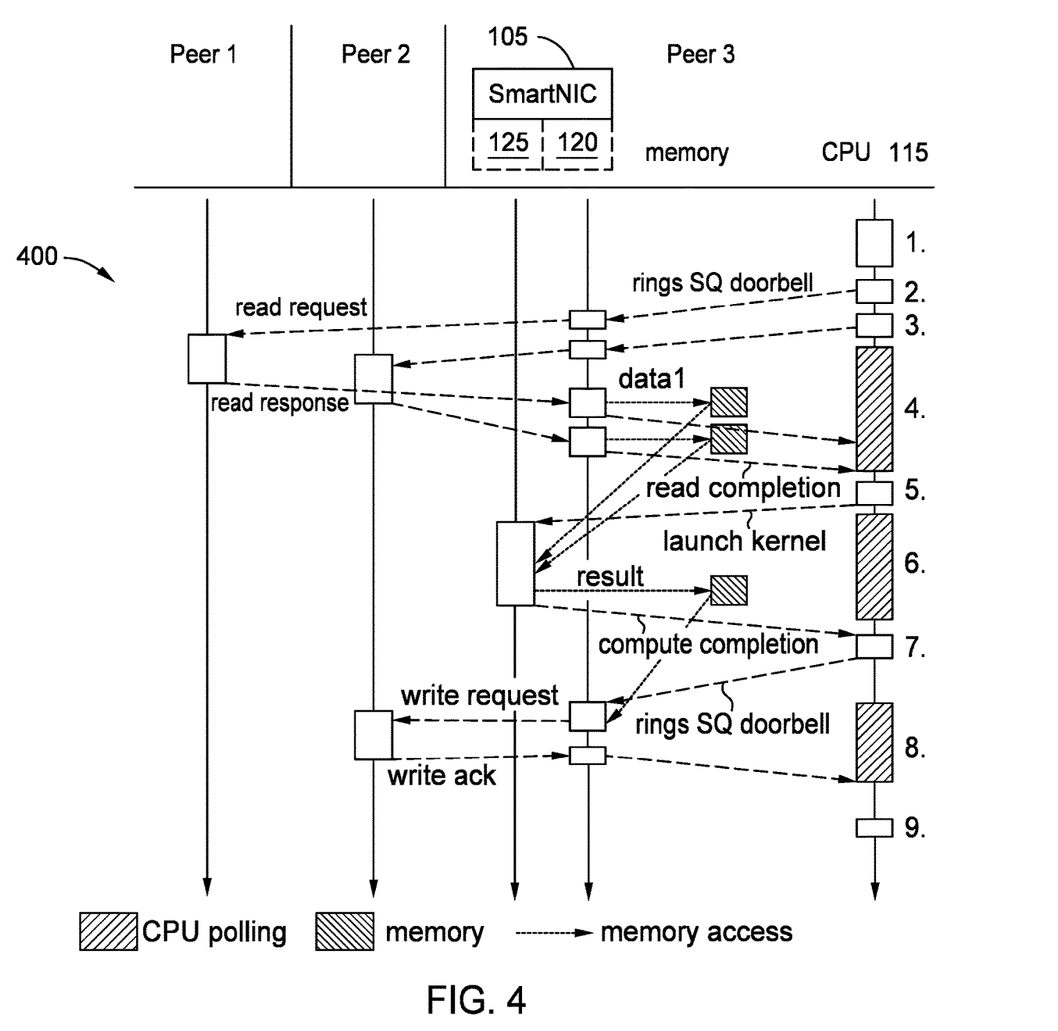
FIG. 4 illustrates an execution workflow of a sample distributed application running on a CPU-driven SmartNIC, according to an example.
Figure 5:
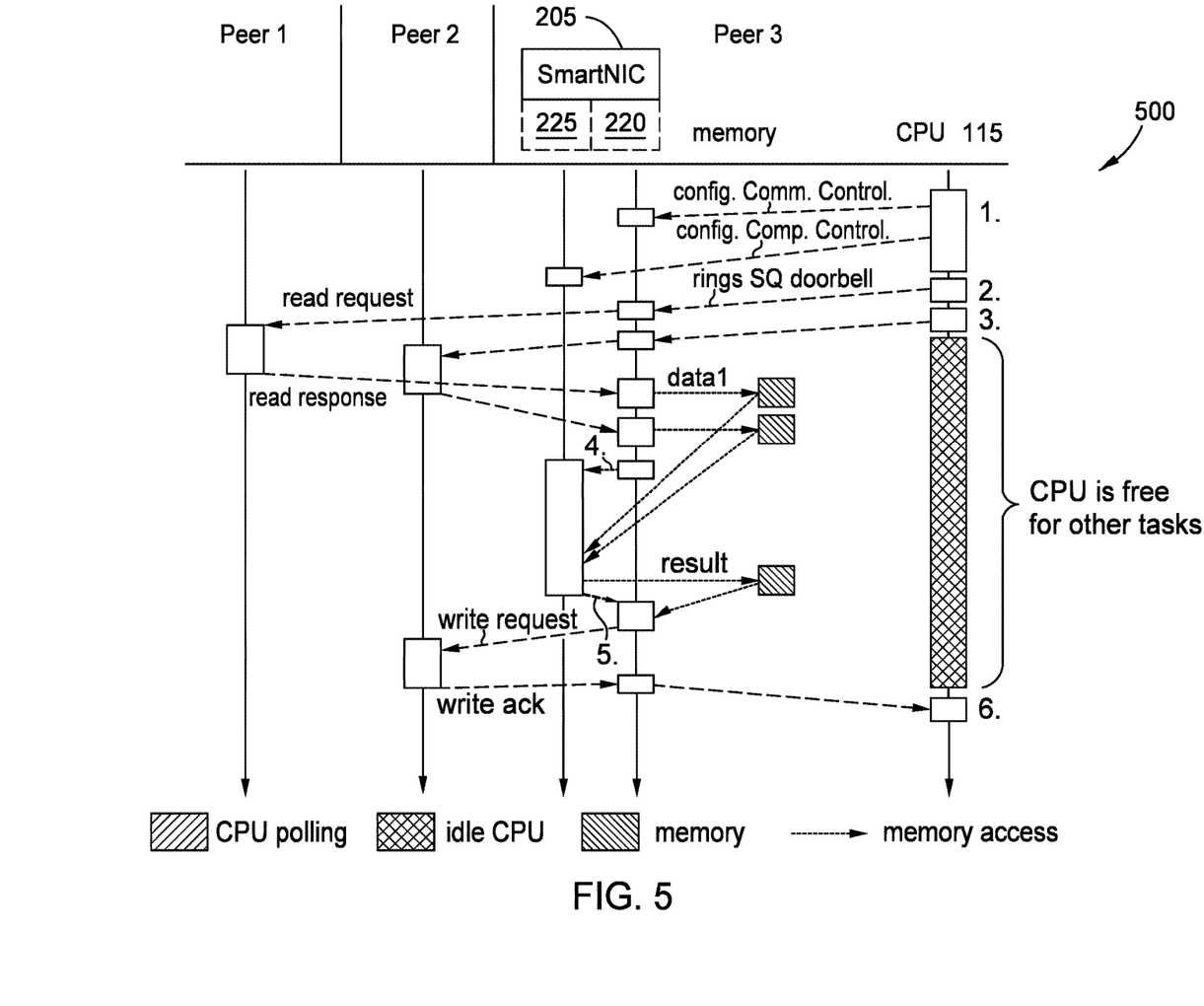
FIG. 5 illustrates an execution workflow of the same sample distributed application in FIG. 4 running on a self-reliant adaptive SmartNIC, according to an example.

FIG. 4 illustrates an execution workflow 400 of a sample distributed application running on a CPU-driven SmartNIC (e.g., the SmartNIC 105 in FIG. 1), while FIG. 5 illustrates an execution workflow 500 of the same sample distributed application running on a self-reliant adaptive SmartNIC (e.g., the SmartNIC 205 in FIGS. 2 and 3).

In this example, the sample distributed application is running across three peers. Peer 3 is a compute node equipped with a CPU-driven SmartNIC, while Peer 1 and 2 are data nodes. Peer 3 is required to fetch messages from Peer 1 and 2, perform computation, and send/write results back to Peer 2.

To start off the workflow, at step 1, the host CPU 115 initializes the system, manages connection setup, and exchanges information with other peers. In this embodiment, to get messages from Peer 1 and 2, at steps 2 and 3 the CPU 115 constructs respective work queue elements (WQE) in an allocated send queue (SQ) in the SmartNIC (e.g., a queue in the NIC circuitry 120). For example, at step 2, the CPU constructs a WQE to get data from Peer 1. At step 3, the CPU constructs a WQE to get data from Peer 2.

After constructing the WQEs, the CPU 115 triggers the RDMA engine in the SmartNIC 105 (which is part of the NIC circuitry 120) to send a read request by ringing the corresponding SQ doorbell. The NIC circuitry 120 receives the doorbells and forwards read requests to Peer 1 and Peer 2.

At step 4, the CPU then waits for messages from Peer 1 and 2 by polling the corresponding completion queue (CQ) doorbells which may be registers in the NIC circuitry 120 (e.g., a memory-mapped register in the transport-layer offloading engine 310 in FIG. 3). That is, the NIC circuitry 120 waits to receive the read responses from Peer 1 and Peer 2. After receiving read responses from Peer 1 or 2, the NIC stores the data in the read responses in memory (e.g., the local memory 130 in FIG. 1) and notifies the host CPU 115 of readiness of the messages by issuing a read completion signal on the respective CQ doorbells.

At step 5, the CPU 115 generates and issues a compute control command to the accelerator 125 in the SmartNIC 105 for launching compute kernels. During the kernel execution, at step 6, the host CPU 115 waits for compute completion signals via polling or interrupt.

When the computation is done, at step 7, the CPU 115 constructs a WQE (similar to step 1) to write the result back to Peer 2. That is, the CPU 115 rings the SQ doorbell in the NIC circuitry 120 in the SmartNIC 105 which triggers the circuitry 120 to send the results in a write request to Peer 2. At step 8, the CPU 115 waits for the write completion by polling the corresponding CQ doorbell.

Once a write completion signal generated by the NIC circuitry 120 is detected in the CQ, at step 9 the CPU can continue to handle the next computation, as determined by the application business logic. As can be seen in FIG. 4, the host CPU 115 spends much of its time in a polling mode, while the SmartNIC 105 works on data communication or computation. Moreover, the host CPU 115 is responsible for control operations used to detect readiness of remote messages.

Turning to FIG. 5, the self-reliant adaptive SmartNIC 205 is used to execute the workflow 500. As shown in FIG. 3, the SmartNIC 205 includes the computation controller 315 and the communication controller 320 to offload control operations from the host CPU 115 onto the SmartNIC 205.

At step 1 in FIG. 5, similar to the workflow 400 in FIG. 4, the host CPU 115 initializes the system, manages connection setup, and exchanges information with other peers. Different from step 1 of the workflow 400 in FIG. 4 is that in FIG. 5 the host CPU 115 configures several tables in the computation controller and communication controller during initialization.

Like in the workflow 400, at steps 2 and 3 in the workflow 500 the CPU 115 constructs respective WQEs in an allocated SQ. For example, at step 2, the CPU constructs a WQE to get data from Peer 1. At step 3, the CPU constructs a WQE to get data from Peer 2. After constructing the WQEs, the CPU 115 triggers the RDMA engine in the SmartNIC 205 (which is part of the NIC circuitry 220) to send a read request by ringing the corresponding SQ doorbell. The NIC circuitry 220 receives the doorbells and forwards read requests to Peer 1 and Peer 2.

However, in contrast to the workflow 400 in FIG. 4 where the CPU waits by polling the CQ doorbell to determine when the data requested from Peers 1 and 2 has been stored in the SmartNIC, after step 3 in the workflow 500 the CPU 115 is free to perform other tasks (or can idle in a low power state). Instead, the control operations used to detect readiness of remote messages are offloaded from the CPU 115 onto the computation controller in the self-reliant SmartNIC 205 without involving the host CPU 115. When the remote messages are received and the requested data is stored in local memory (e.g., the memory 350 in FIG. 3), at step 4 the computation controller issues a signal to launch kernel execution in the accelerator 225.

After computation is finished, at step 5 the communication controller constructs a WQE in an allocated SQ and triggers the RDMA engine to send a write request to Peer 2 by ringing the corresponding SQ doorbell without involving the host CPU 115. Once the write request is acknowledged by Peer 2, the communication controller notifies the host CPU 115 of the write completion via an interrupt at step 6. During the period between steps 3 and 6 in the workflow 500, the host CPU 115 does not need to execute any code in support of the distributed application, and is free for other tasks, or it can be put in a low power mode if it remains idle. Therefore, by offloading control operations to the SmartNIC 205, the proposed self-reliant adaptive SmartNIC 205 can significantly reduce CPU utilization (or CPU computer power dimensioning at design time) and achieve lower latency and higher-performance.

Figure 6:
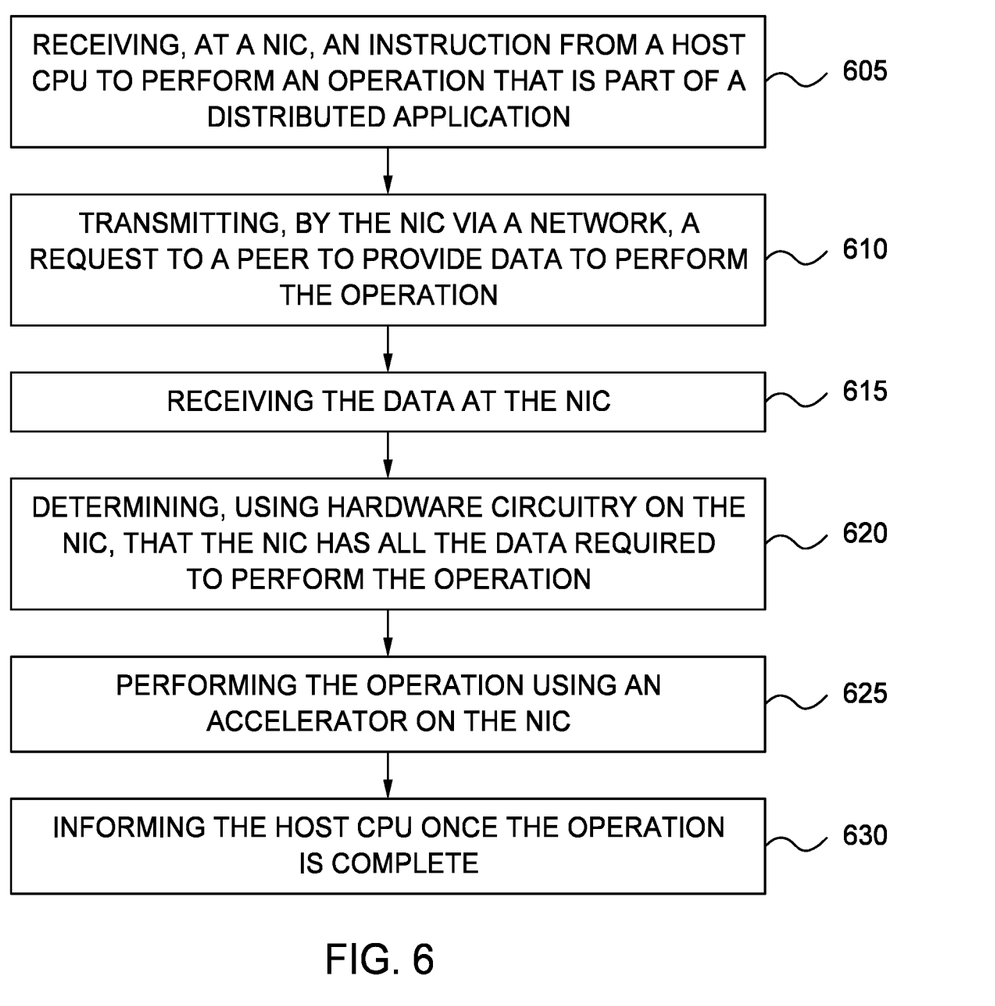
FIG. 6 is a flowchart for executing a distributed application using a self-reliant SmartNIC, according to an example.

FIG. 6 is a flowchart for executing a distributed application using a NIC, according to an example. At block 605, a NIC (e.g., a NIC that includes an accelerator, such as a SmartNIC) receives an instruction from a host CPU to perform an operation that is part of a distributed application. The instruction can include the host CPU performing system initialization, managing connections, performing handshaking with other peers and configuring several tables in a computation controller (e.g., a first controller) and a communication controller (e.g., a second controller) in the NIC. In one embodiment, the host CPU can transmit WQEs to the NIC to start the method 600. That is, the WQEs can provide instructions for the NIC to retrieve the data for completing a task for the distributed application (e.g., a machine learning application, or an edge computing application).

At block 610, the NIC transmits, via a network, a request to a peer to provide data to perform the operation. For example, the NIC may request data from the one or more peers identified by the host CPU.

At block 615, the NIC receives the data from the peer or peers.

At block 620, the NIC determines, using hardware circuitry in the NIC, that the NIC has all the data required to perform the operation. For example, the hardware circuitry can include the computation controller 315 in FIG. 3 which detects readiness of incoming messages from the network from the one or more peers. Advantageously, because circuitry in the NIC determines when the required data has been received, this frees up the host CPU to perform other tasks while the NIC is waiting to receive the data from the peers. In one embodiment, the NIC is not polled by the host CPU to determine whether all the data has been received.

At block 625, the accelerator on the NIC performs the operation using an accelerator on the NIC. In one embodiment, the computation controller in the NIC launches one or more kernels in the accelerator, which process the data received from the peers. As discussed above, the NIC can instruct its accelerator to perform the operation without the host CPU providing permission.

At block 630, the NIC informs the host CPU once the operation is complete. In one embodiment, the communication controller 320 in FIG. 3 in the NIC can monitor the accelerator to determine when the task is complete, and then inform the host CPU.

As such, advantageously the host CPU does not have to monitor the NIC during this time, but is free to do other tasks (or to switch to a low power state). That is, after starting the method 600, the host CPU is removed from the critical path such that it is free to perform other tasks while the method 600 is performed. In one embodiment, the NIC can transmit an interrupt to the host CPU when the computation is complete—e.g., after the results have been generated by the accelerator, or after the results have been stored in the appropriate location (e.g., on local memory or at a peer).

Figure 7:
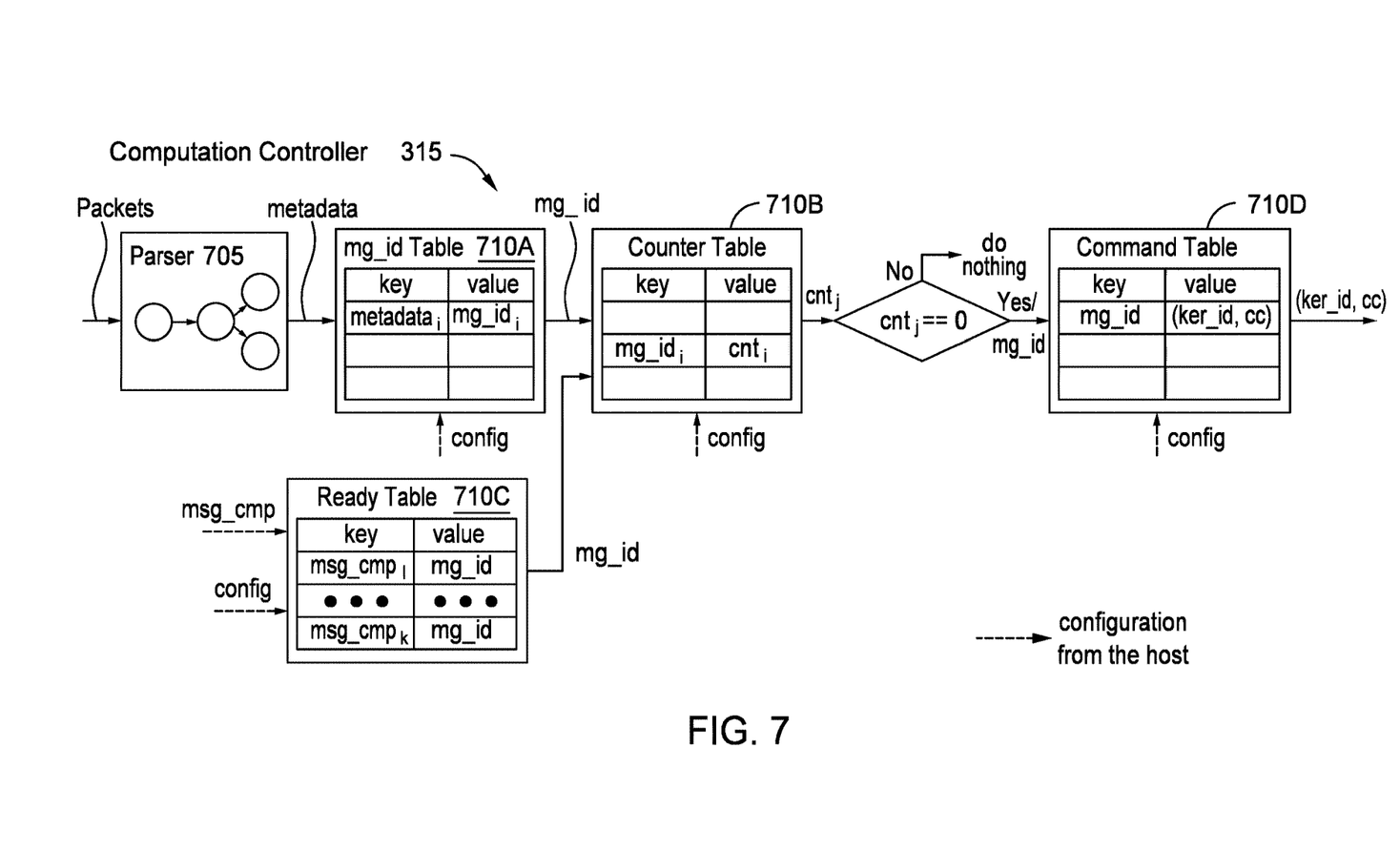
FIG. 7 illustrates an example of a computation controller, according to an example.

FIG. 7 illustrates an example of the computation controller 315, according to an example. As discussed above, the computation controller 315 can detect readiness of incoming messages used by an application from the network and trigger execution of kernels in the accelerator (not shown) in the SmartNIC after the necessary messages (and corresponding data) have been received. This can be performed without having to involve a host CPU.

As shown, the computation controller 315 includes a parser 705 and four tables (i.e., mg_id table 710A, counter table 710B, ready table 710C, and command table 710D) which configure the computation controller 315 to detect readiness of incoming messages required by accelerators and trigger computation when the necessary messages are received. In one embodiment, the host CPU provides configuration data used to populate tables 710 so the NIC can detect readiness of incoming messages for each accelerator and trigger computation accordingly when messages are ready.

In one embodiment, the parser 705 extracts information from an incoming network packet and generates metadata. The metadata can include information such as source Internet Protocol (IP) address. User Datagram Protocol (UDP) source port number, destination queue pair (QP) number, and RDMA opcode. With the metadata, the computation controller 315 performs a lookup operation in the mg_id table 710A to identify a unique number, a message group ID (mg_id). The mg_id table 710A is designed to identify which mg_id an incoming packet belongs to. An entry in the mg_id table 710A has a <key, value> pair, where the key is the metadata defined above and the value is a mg_id. In one embodiment, a mg_id is a unique number assigned to a scheduled compute task or job. Allocation of a mg_id for a compute task or job can be done in either hardware or software. Entries of the mg_id table 710A can be updated or populated by the host CPU in the initiation step (e.g., step 1 in FIG. 5).

When obtaining the corresponding mg_id, the computation controller 315 performs an update operation to the counter table 710B to decrease the associated counter (cnt) by one, indicating that a remote message has arrived.

The ready table 710C is used to notify the counter table 710B that a remote message arrived from the network is successfully stored in the memory (e.g., the local memory 350 in FIG. 3). An entry in the ready table 710C is composed of a <key, value> pair, where its key is a message completion signal (msg_cmp) and its value is a mg_id. A msg_cmp signal indicates that a remote message required is successfully received and stored in the memory. The msg_cmp signal can contain any information relevant, such as memory address of the last chunk of an incoming remote message stored in the memory. It can be obtained or derived from output signals of an RDMA engine.

The counter table 710B keeps track of readiness of remote messages required by a compute task or job. An entry in the counter table 710B can include a mg_id as the key and a launch countdown counter (cnt) as the value. The value of the cnt is the number of remote messages required by the compute task/job corresponding to the mg_id. When receiving a mg_id from the mg_id table 710A, the value of the corresponding cnt is decreased by one, indicating that a remote message from the network has arrived. When a mg_id from the ready table 710C is received and the value of the associated cnt in the counter table 710B is equal to zero, it means that all remote messages required to compute the task or job have been received and stored in the memory. The computation controller 315 can then perform a lookup operation with the mg_id to the command table 710D and trigger the execution of a corresponding kernel if the lookup is hit.

The command table 710D issues compute control commands to the accelerator for kernel execution when the required messages from the Peer nodes have been received. The command table 710D contains <key, value> pairs, where the key is a mg_id and the value is a (ker_id, cc) pair. The ker_id represents a unique number associated with a kernel in the accelerator for kernel identification, and cc is a compute control command or pointer to the compute control command. A compute control command is a data structure used to start kernel computation with a workload, and contains arguments required by kernel execution such as memory addresses of input/output data and scalar variables.

An update/write configuration operation by a host CPU (illustrated by the dashed arrows in FIG. 7) to the four tables 710 can be implemented with Advanced extensible Interface-Lite (AXI-Lite). The four tables 710 can be implemented with hashing, binary/ternary/semi-ternary content addressable memory BCAM, TCAM, STCAM, a register file (RF), etc.

Figure 8:
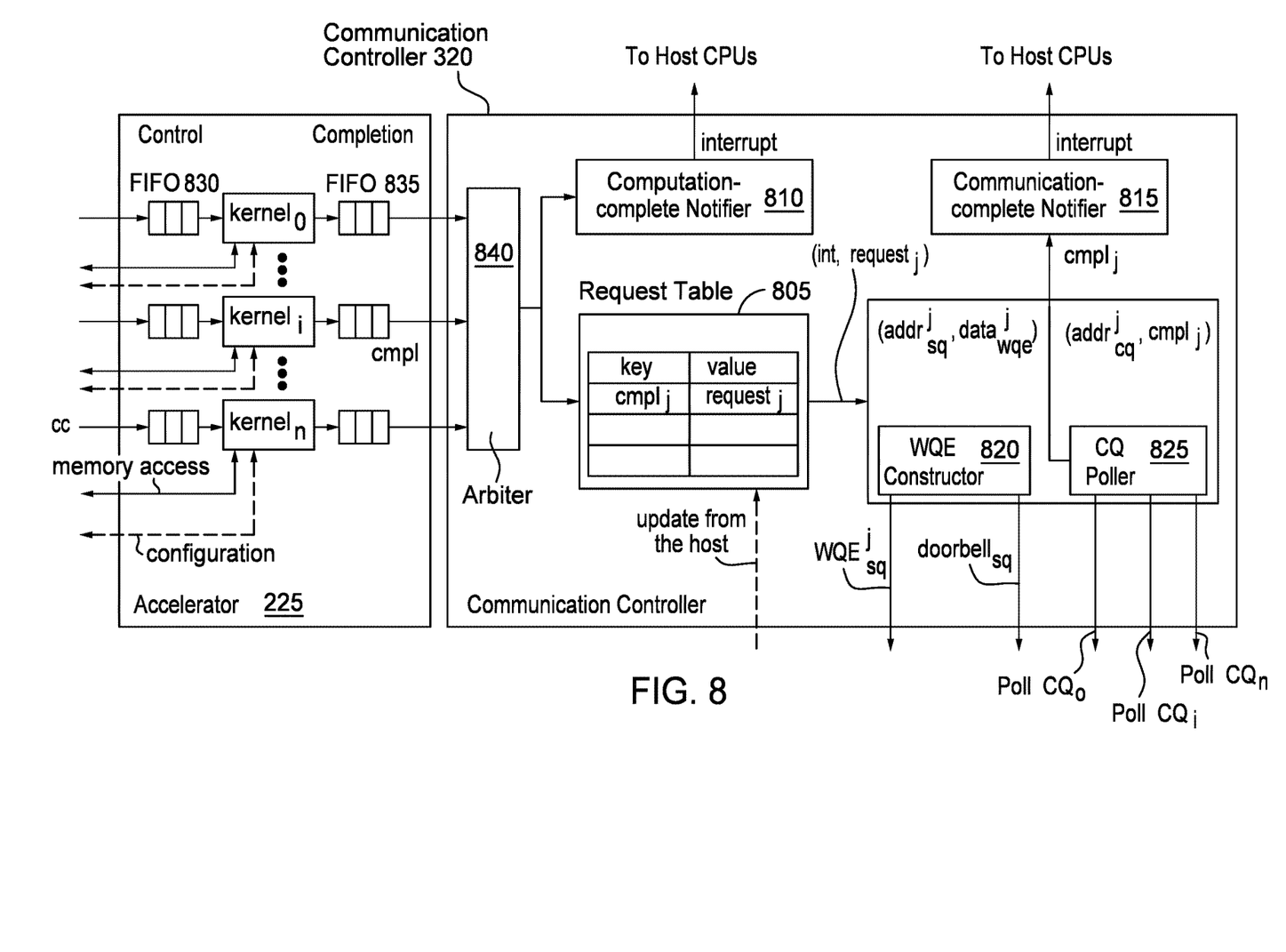
FIG. 8 illustrates an example of a communication controller, according to an example.

FIG. 8 illustrates an example of the communication controller 320, according to an example. As discussed above, the communication controller 320 monitors completion status of kernel execution in the accelerator 225 in the SmartNIC, and when the task or job is complete, generates RDMA requests to the transport-layer offloading engine without the host CPU's involvement. The communication controller 320 includes a request table 805 (a matching table), a computation-complete notifier circuit 810, a communication-complete notifier circuit 815, a work-queue-element (WQE) constructor circuit 820, and a CQ poller circuit 825.

The request table 805 handles communication requests when a kernel in the accelerator 225 finishes its computation. An entry in the table 805 includes a <key, value> pair, where the key is a completion signal, cmplj, and the value, requestj, can be a communication request or a pointer to a list of communication requests. A cmpl signal might include information such as a mg_id, and a kernel ID, ker_id, while a communication request, request, may include information such as memory address of an allocated send queue, addrsq, doorbell addresses (doorbellsq and doorbellcq) of the corresponding SQ and CQ, and data used to construct a WQE structure, datawqe.

Entries of the request table 805 can be updated or written by a host CPU in the initiation step (e.g., step 1 in FIG. 5). An update/write configuration operation (illustrated by the dashed arrows in FIG. 8) to the request table 805 from a host CPU can be implemented with AXI-Lite. The table 805 can be implemented with hashing, binary/ternary/semi-ternary content addressable memory (BCAM, TCAM, STCAM), a register file (RF) etc.

In one embodiment, the computation-complete notifier circuit 810 issues a compute completion signal of a corresponding kernel in the accelerator 225 to the host CPUs via an interrupt. The computation-complete notifier circuit 810 allows the host CPUs to proceed with the next computation if there is no communication request after computation.

Similarly, the communication-complete notifier circuit 815 notifies host CPUs of completion of data communication operations such as ROMA write/send via an interrupt. Polling can also be used for the computation-complete notifier circuit 810 and communication-complete notifier circuit 815, but that would mean the host CPUs would be in a busy-waiting mode.

In one embodiment, the WQE constructor circuit 820 generates and issues WQE requests to the Transport-layer Offloading Engine. Using requestj received from the request table 805, the WQE constructor circuit 820 constructs a WQE data structure for each communication request, writes a generated WQEsq to the corresponding SQ, and rings its doorbell to trigger the transport-layer offloading engine for packet generation and transmission.

The CQ poller circuit 825 can detect whether a WQE request from the WQE constructor circuit 820 has been completed by the transport-layer offloading engine. The detection operation may be done via polling a doorbell of a CQ. Once a WQE request has been served, the CQ poller circuit 825 issues a corresponding completion signal, cmpl, to the host CPUs via the communication-complete notifier circuit 815.

FIG. 8 demonstrates one example of an accelerator 225 implementation by having an input control FIFO (First In, First Out) and an output completion FIFO attached to each kernel accelerator. A compute control command, cc, from the computation controller in FIG. 7 can be pushed into the a control FIFO 830, while a completion signal (cmpl) is written into a completion FIFO 835 when a kernel finishes its execution.

The communication controller 320 receives completion signals (cmpl) from the accelerator 225 as input. An arbiter 840 can process the completion requests one by one. The computation-complete notifier circuit 810 receives a cmpl signal from the arbiter 840 and notifies the host CPUs of completion of a job or task in a corresponding kernel in the accelerator 225. Meanwhile, the communication controller 320 indexes into the request table 805 with the cmpl signal. If the lookup is a miss, the communication controller 320 does nothing. Otherwise, the WQE constructor circuit 820 uses the output from the request table 805 as input, and then constructs and issues a WQE request to the transport-layer offloading engine. The CQ poller circuit 825 can monitor the status of the generated WQE request. Once the communication request has been served, the communication-complete notifier circuit 815 can notify the host CPUs via an interrupt. The host CPUs then can proceed with the next available computation.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A network interface controller (NIC), comprising:
   an accelerator comprising one or more integrated circuits; and
   circuitry configured to:
      receive an instruction from a host central processing unit (CPU) coupled to the NIC to perform an operation that is part of a distributed application;
      transmit, via a network, a request to a peer to provide data to perform the operation;
      receive the data from the peer via the network;
      in response to the NIC determining it has all data required to perform the operation, instruct the accelerator to perform the operation, wherein the NIC instructs the accelerator to perform the operation without involvement from the host CPU; and
      inform the host CPU after the operation is complete.

2. The NIC of claim 1, wherein the host CPU is free to perform other tasks while the NIC receives the data from the peer and performs the operation using the accelerator.

3. The NIC of claim 1, wherein the circuitry is configured to:
   transmit, via the network, requests to multiple peers to provide data to perform the operation, wherein the circuitry ensures that the data is received from each of the multiple peers before instructing the accelerator to perform the operation.

4. The NIC of claim 3, wherein the circuitry is configured to:
   transmit results of performing the operation to destination peers before informing the host CPU that the operation is complete.

5. The NIC of claim 1, wherein, before transmitting the request to the peer, the circuitry is configured to receive data from the host CPU used to populate tables in the circuitry to permit the NIC to monitor readiness of each group of messages required by a compute task or job.

6. The NIC of claim 5, wherein the data from the host CPU provides entries for a message group ID table in the NIC.

7. The NIC of claim 1, wherein the NIC is not polled by the host CPU to determine when the NIC has all the data required to perform the operation.

8. The NIC of claim 1, wherein the NIC is configured to instruct the accelerator to perform the operation without the host CPU providing permission.

9. A method comprising:
receiving, at a network interface controller (NIC), an instruction from a host central processing unit (CPU) to perform an operation that is part of a distributed application;
transmitting, by the NIC via a network, a request to a peer to provide data to perform the operation;
receiving the data at the NIC;
in response to the NIC determining it has all data required to perform the operation, performing the operation using an accelerator on the NIC, wherein the accelerator begins performing the operation without involvement from the host CPU; and
informing the host CPU once the operation is complete.

10. The method of claim 9, wherein the host CPU is free to perform other tasks while the NIC receives the data from the peer and performs the operation using the accelerator.

11. The method of claim 9, further comprising:
transmitting, via the network, requests to multiple peers to provide data to perform the operation, wherein the NIC ensures that the data is received from each of the multiple peers before instructing the accelerator to perform the operation.

12. The method of claim 11, further comprising:
transmitting results of performing the operation to destination peers before informing the host CPU that the operation is complete.

13. The method of claim 9, further comprising, before transmitting the request to the peer:
receiving data from the host CPU used to populate tables in the NIC to permit the NIC to monitor readiness of each group of messages required by a compute task or job.

14. The method of claim 13, wherein the data from the host CPU provides entries for a message group ID table in the NIC.

15. The method of claim 9, wherein the NIC is not polled by the host CPU to determine when the NIC has all the data required to perform the operation.

16. The method of claim 9, wherein the NIC instructs the accelerator to perform the operation without the host CPU providing permission.

17. A Smart network interface controller (SmartNIC), comprising:
an accelerator; and
a first controller comprising circuitry configured to:
receive an instruction from a host central processing unit (CPU) coupled to the SmartNIC to perform an operation that is part of a distributed application,
transmit, via a network, a request to a peer to provide data to perform the operation,
receive the data from the peer via the network, and
in response to the SmartNIC determining it has all data required to perform the operation, instruct the accelerator to perform the operation, wherein the SmartNIC instructs the accelerator to perform the operation without involvement from the host CPU; and
a second controller comprising circuitry configured to inform the host CPU after the operation is complete and trigger the SmartNIC to transmit results of performing the operation to destination peers.

18. The SmartNIC of claim 17, wherein the host CPU is free to perform other tasks while the SmartNIC receives the data from the peer and performs the operation using the accelerator.

19. The SmartNIC of claim 17, wherein the first controller is configured to:
transmit, via the network, requests to multiple peers to provide data to perform the operation, wherein the first controller ensures that the data is received from each of the multiple peers before instructing the accelerator to perform the operation.

20. The SmartNIC of claim 19, wherein the second controller is configured to:
transmit results of performing the operation to the destination peers before informing the host CPU that the operation is complete.

* * * * *